US009721191B2

(12) United States Patent
Song et al.

(10) Patent No.: US 9,721,191 B2
(45) Date of Patent: Aug. 1, 2017

(54) METHOD AND SYSTEM FOR IMAGE RECOGNITION OF AN INSTRUMENT

(71) Applicant: NATIONAL CHIAO TUNG UNIVERSITY, Hsinchu (TW)

(72) Inventors: Kai-Tai Song, New Taipei (TW); Kateryna Zinchenko, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 66 days.

(21) Appl. No.: 15/013,870

(22) Filed: Feb. 2, 2016

(65) Prior Publication Data
US 2016/0342847 A1   Nov. 24, 2016

(30) Foreign Application Priority Data

May 20, 2015   (TW) .............................. 104116048 A

(51) Int. Cl.
| | | |
|---|---|---|
| G06K 9/00 | (2006.01) |
| G06K 9/44 | (2006.01) |
| G06K 9/62 | (2006.01) |
| G06K 9/66 | (2006.01) |
| A61B 1/00 | (2006.01) |

(52) U.S. Cl.
CPC ............ *G06K 9/66* (2013.01); *A61B 1/00147* (2013.01); *G06K 2209/057* (2013.01)

(58) Field of Classification Search
CPC . G06K 9/66; G06K 2209/057; A61B 1/00147
See application file for complete search history.

(56) References Cited

U.S. PATENT DOCUMENTS

| | | |
|---|---|---|
| 5,649,021 A | 7/1997 | Matey et al. |
| 8,147,503 B2 | 4/2012 | Zhao et al. |
| 2009/0088634 A1* | 4/2009 | Zhao ...................... B25J 9/1689 600/427 |
| 2013/0295540 A1 | 11/2013 | Kesavadas |
| 2015/0170381 A1* | 6/2015 | Liu .................... H04N 5/23229 348/77 |

OTHER PUBLICATIONS

Reiter et al. "Learning Features on Robotic Surgical Tools." IEEE Computer Society Conference on Computer Vision and Pattern Recognition Workshops, Jul. 16, 2012, pp. 38-43.*

(Continued)

*Primary Examiner* — Jon Chang
(74) *Attorney, Agent, or Firm* — Faegre Baker Daniels LLP

(57) ABSTRACT

A method for image recognition of an instrument includes: obtaining an input image containing a to-be-recognized instrument; selecting from the input image a region-of-interest containing the to-be-recognized instrument; determining in a high-to-low order of priority values of instrument categories, whether the to-be-recognized instrument contained in the region-of-interest belongs to one of the instrument categories according to the region-of-interest and a respective one of plural groups of sample images; and increasing the priority value of the one of the instrument categories when it is determined that the to-be-recognized instrument belongs to the one of the instrument categories.

20 Claims, 7 Drawing Sheets

(56) References Cited

OTHER PUBLICATIONS

Liu et al. "A Vision-based Surgical Instruments Classification System." International Conference on Advanced Robotics and Intelligent Systems, Jun. 6, 2014, pp. 18-22.*

C. J. Chen, W.S.-W. Huang and K. T. Song "Image Tracking of Laparoscopic Instrument Using Spiking Neural Networks," 13th International Conference on Control, Automation and Systems, Kwangju, Korea, Oct. 20-23, 2013, pp. 951-955.

Max Allan, Sebastien Ourselin, Steve Thompson, David J. Hawkes, John Kelly and Danail Stoyanov "Toward Detection and Localization of Instruments in Minimally Invasive Surgery," IEEE Transactions on Biomedical Engineering, vol. 60, No. 4, Apr. 2013, pp. 1050-1058.

* cited by examiner

| Instrument category | | Number of sample images |
|---|---|---|
| A |  | 20 |
| B |  | 35 |
| C |  | 43 |

METHOD AND SYSTEM FOR IMAGE RECOGNITION OF AN INSTRUMENT

CROSS-REFERENCE TO RELATED APPLICATION

This application claims priority of Taiwanese Patent Application No. 104116048, filed May 20, 2015, the entire disclosure of which is hereby expressly incorporated herein by reference.

FIELD

The disclosure relates to a method and a system for image recognition of an instrument, more particularly to a method and a system for image recognition of an instrument which realize automatic and fast instrument recognition and instrument tracking.

BACKGROUND

Minimally invasive surgery refers to a surgical technique that makes a minimum incision needed during an operation and uses an endoscope, e.g., a laparoscope or thoracoscope, and a special surgical instrument to be extended through the incision for treatment and diagnosis purposes. Minimally invasive surgery has numerous advantages, such as less pain, faster recovery, and high safety.

During a minimally invasive surgery, surgical instruments are held by a surgeon to perform operation, and the endoscope is held by an assistant and is inserted through the incision to provide image information inside a body cavity, e.g., a chest cavity or an abdominal cavity, to the surgeon for facilitating the operation. However, since the endoscope is held by the assistant's hand which may become fatigued during a long surgery, hand trembling, delay in positioning and handling faults may incur a risk during operation.

A conventional image tracking system includes an image capturing module which captures a real-time image, a detection module which analyzes the real-time image and detects positions of instruments according to different color rings provided respectively on the instruments, and a processing module which emits controlling signal based on the positions of instruments to control the image capturing module to move to a desired position. All of the instruments must be sterile during the operation, but the color rings provided on the instruments might not satisfy this requirement.

SUMMARY

Therefore, an object of the disclosure is to provide a method and a system for image recognition of an instrument which overcome the aforementioned issue.

In a first aspect of the disclosure, the method for image recognition of an instrument is to be implemented by a system including an image processing unit and a database. The database stores a plurality of groups of sample images, each of the groups belonging to a respective one of a variety of instrument categories. Each of the instrument categories corresponds to a respective priority value. The method includes the steps of:

obtaining, by the image processing unit, an input image containing a to-be-recognized instrument;

selecting from the input image, by the image processing unit, a region-of-interest which contains the to-be-recognized instrument;

determining in a high-to-low order of the priority values of the instrument categories, by the image processing unit, whether the to-be-recognized instrument of the region-of-interest belongs to one of the instrument categories according to the region-of-interest and the respective one of the groups; and increasing, by the image processing unit, the priority value of said one of the instrument categories when it is determined that the to-be-recognized instrument of the region-of-interest belongs to said one of the instrument categories.

In a second aspect of the disclosure, the system for image recognition of an instrument includes a database and an image processing unit. The database stores a plurality of groups of sample images, each of the groups belonging to a respective one of a variety of instrument categories. Each of the instrument categories corresponds to a respective priority value. The image processing unit is coupled electrically to the database, and is programmed to obtain an input image containing a to-be-recognized instrument, select from the input image a region-of-interest which contains the to-be-recognized instrument, determine, in a high-to-low order of the priority values of the instrument categories, whether the to-be-recognized instrument of the region-of-interest belongs to one of the instrument categories according to the region-of-interest and the respective one of the groups, and increase the priority value of said one of the instrument categories when it is determined that the to-be-recognized instrument of the region-of-interest belongs to said one of the instrument categories.

BRIEF DESCRIPTION OF THE DRAWINGS

Other features and advantages of the disclosure will become apparent in the following detailed description of an embodiment with reference to the accompanying drawings, of which.

DETAILED DESCRIPTION

Figure 1:
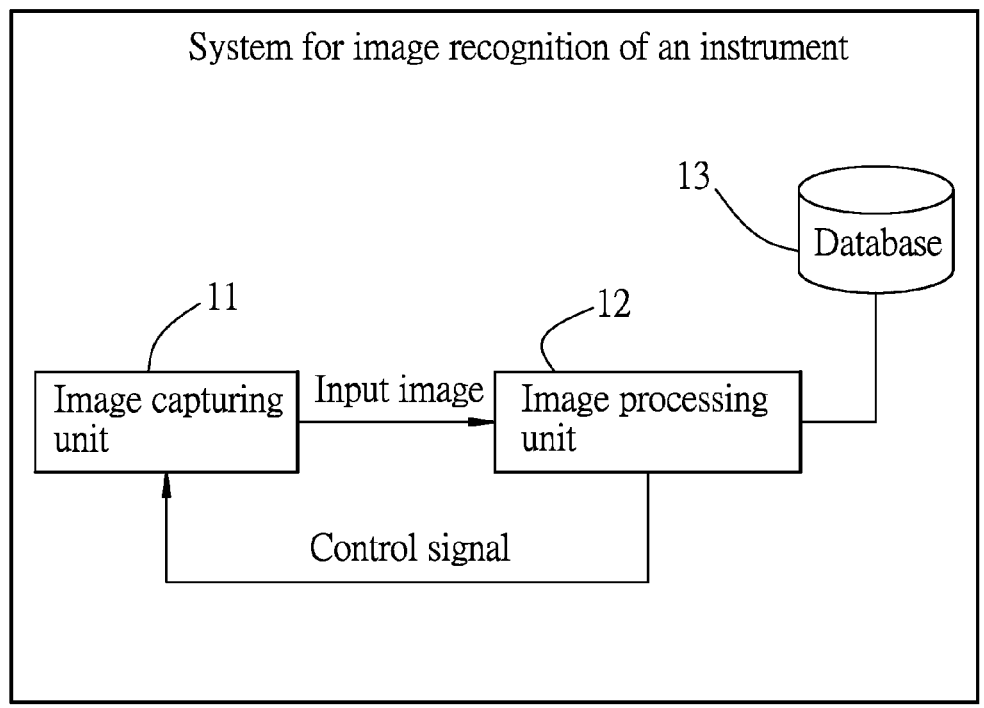
FIG. 1 is a block diagram illustrating an embodiment of a system which implements a method for image recognition of an instrument according to the disclosure.

Referring to FIG. 1, an embodiment of a method for image recognition of an instrument according to the disclosure is to be implemented by a system which includes an image capturing unit 11, an image processing unit 12 and a database 13.

The database 13 is an instrument library which stores training results of plural groups of sample images, each of the groups belonging to a respective one of a variety of instrument categories. Each of the instrument categories corresponds to a respective priority value, and in the beginning, the instrument categories correspond to an identical initial priority value. Sample images in each of the plural groups are reference images of instruments for the respective one of the instrument categories.

The image capturing unit 11 is exemplified as an endoscope, such as a laparoscope or a thoracoscope, and is used to capture an input image 14 (see FIGS. 6 and 7) during a minimally invasive surgery. In this embodiment, the image capturing unit 11 is held by a robotic arm (not shown) so as to steadily capture images.

The image processing unit 12 is connected electrically to the image capturing unit 11 and the database 13, and is programmed to perform image processing related to this embodiment.

Detailed steps of the embodiment of the method for image recognition of an instrument are explained hereinafter.

Figure 2:
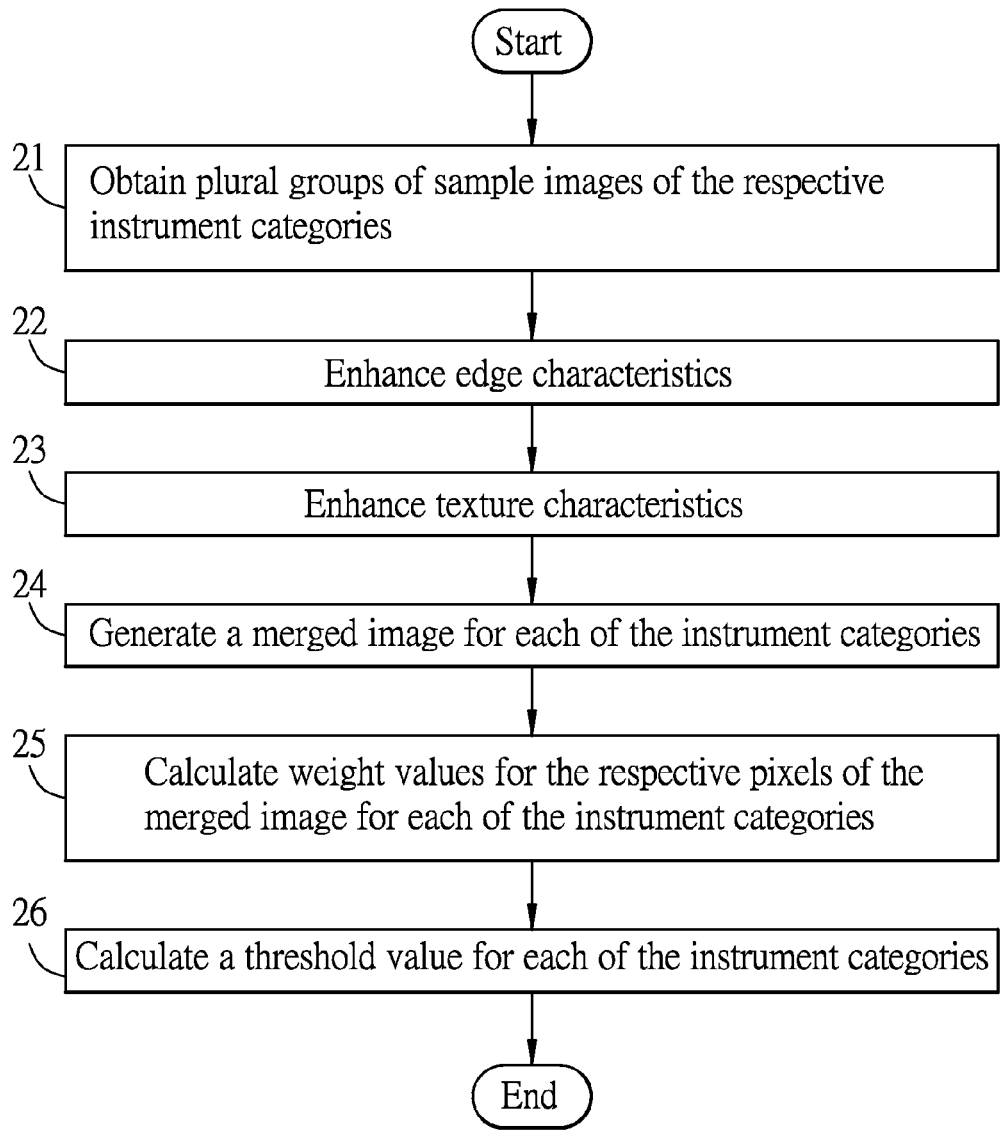
FIG. 2 is a flow chart illustrating an embodiment of a training process of the method for image recognition of an instrument.
Figure 3:
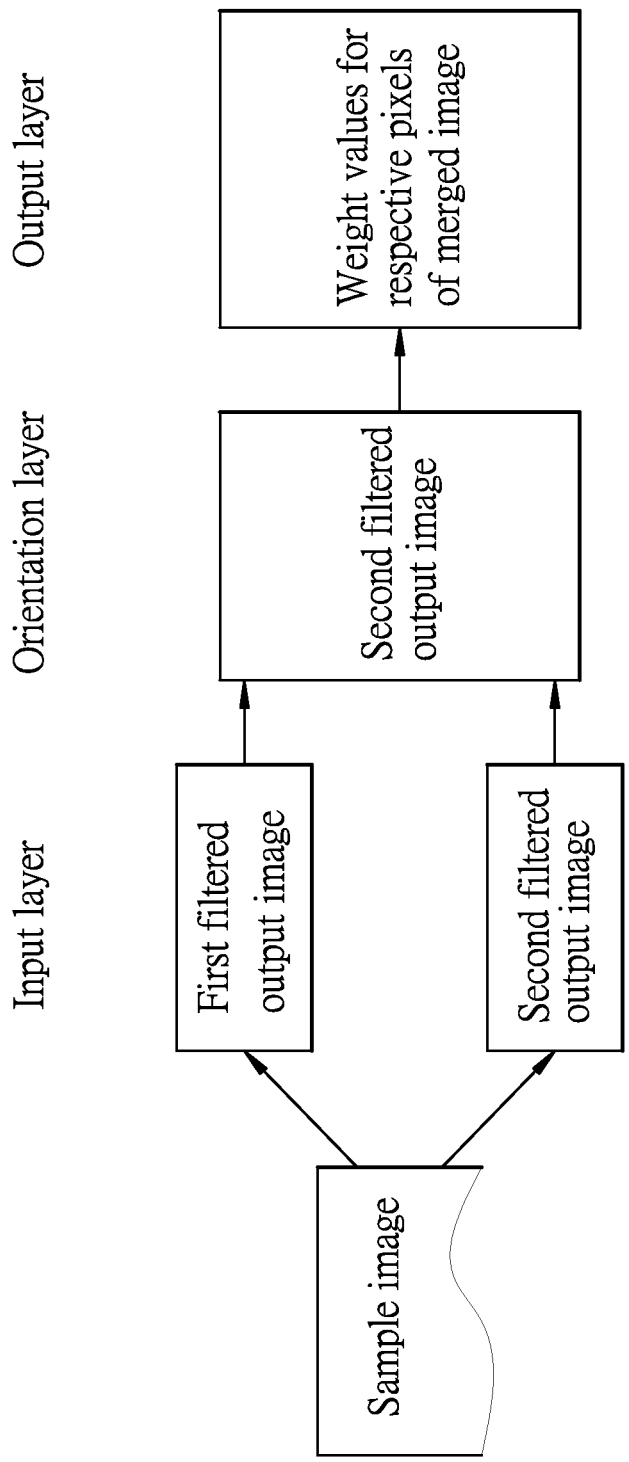
FIG. 3 is a schematic diagram illustrating in combination with FIG. 2 the embodiment of the training process.
Figure 4:
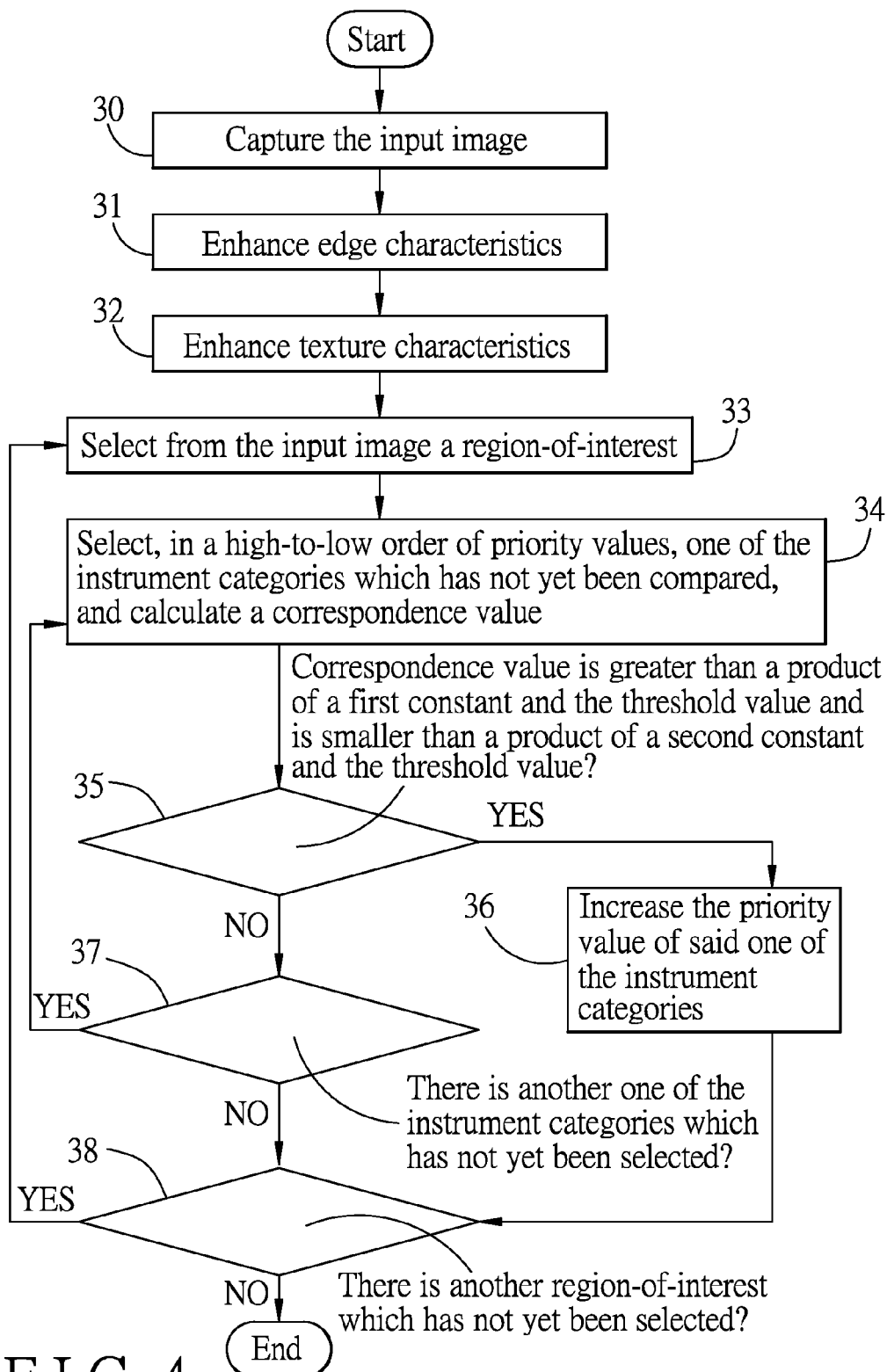
FIG. 4 is a flow chart illustrating an embodiment of a detection process of the method for image recognition of an instrument.

Referring to FIG. 2, FIG. 3 and FIG. 4, the embodiment includes a training process which involves step 21 to step 26 to be performed by the image processing unit 12 which is programmed to perform the training process, and a detection process which involves step 30 to step 38.

In step 21, the image processing unit 12 obtains the plural groups of sample images of the respective instrument categories. Specifically, in order to enable the image processing unit 12 to recognize a to-be-recognized instrument contained in the input image 14 during the detection process, in this embodiment, the image processing unit 12 retrieves a large amount of sample images to serve as training samples, and stores the training results obtained from the training process in the database 13. Furthermore, by means of the machine learning algorithm, a spiking neural network model as illustrated in FIG. 3 may be established.

Each of the sample images in the plural groups has pixels which are located at respective pixel coordinates and which have respective grayscale values. That is to say, if a matrix $[A_{ij}]_{m \times n}$ represents one of the sample images having m×n pixels (m, n are integers), the matrix element $A_{ij}$ represents the grayscale value of the pixel which is located at the pixel coordinates (i,j). In this embodiment, since the grayscale value of a pixel is recorded in a manner of eight binary digits, the grayscale value of each of the pixels is an integer raging between 0 to 255.

In step 22, the image processing unit 12 enhances edge characteristics for each of the sample images in the plural groups. Specifically, referring to FIG. 3, by using a Laplacian of Gaussian filter to perform an on-center filter operation and an off-center filter operation on each of the sample images, a first filtered output image and a second filtered output image are obtained, respectively, for the sample image. The first filtered output image and the second filtered output image serve as an input layer for the spiking neural network model.

In step 23, the image processing unit 12 enhances texture characteristics for each of the sample images in the plural groups. Specifically, referring to FIG. 3, by using a Gabor filter to rotate the first filtered output image and the second filtered output image by different rotation angles, corresponding texture response images are obtained. The rotation angles are, for instance, 45 degrees apart. More specifically, the first filtered output image is filtered by Gabor filters with orientations of 0, 45, 90 and 135 degrees to result in four texture response images, and the second filtered output image is filtered by Gabor filters with orientations of 180, 225, 270 and 315 degrees to result in four other texture response images. The texture response images with different orientations are subsequently averaged to result in a characteristic image, which is a result of edge characteristic enhancement and texture characteristic enhancement for the corresponding sample image. The aforementioned angle of rotation is merely exemplified for the sake of explanation; other implementations do not exceed the teachings of the disclosure as long as the characteristic image is obtained with rotation by every specific angle. The characteristic image for each of the sample images in the plural groups serves as an orientation layer for the spiking neural network model.

In step 24, the image processing unit 12 generates a merged image for each of the instrument categories. Each pixel of the merged image has a grayscale value equal to an average of the grayscale values of those of pixels of all the characteristic images, which are obtained from the sample images in a respective one of the plural groups, at the same pixel coordinates as the pixel coordinates of the pixel of the merged image. For example, if one of the plural groups corresponding to a specific instrument category includes two sample images, and if the characteristic images corresponding respectively to the two sample images are $[X_{ij}]_{3 \times 3}$ and $[Y_{ij}]_{3 \times 3}$, in which $$[X_{ij}]_{3 \times 3} = \begin{bmatrix} 100 & 180 & 10 \\ 25 & 0 & 35 \\ 0 & 2 & 40 \end{bmatrix}, \text{ and } [Y_{ij}]_{3 \times 3} = \begin{bmatrix} 50 & 90 & 10 \\ 35 & 0 & 25 \\ 0 & 2 & 20 \end{bmatrix},$$

the merged image for the specific instrument category is $$[Z_{ij}]_{3 \times 3} = \begin{bmatrix} 75 & 135 & 10 \\ 30 & 0 & 30 \\ 0 & 2 & 30 \end{bmatrix}.$$

In step 25, for each of the instrument categories, the image processing unit 12 calculates weight values for the respective pixels of the merged image according to the corresponding grayscale values of the respective pixels of the merged image, respectively. The weight values are respectively positively correlated to the corresponding grayscale values of the respective pixels of the merged image. In other words, each of the pixels of the merged image serves as a respective neuron in the spiking neural network model, and the grayscale value of each of the pixels of the merged image serves as an activity level of a synapse of a respective neuron. Since most of the instruments are made of metals, the greater the grayscale value of each of the pixels (i.e., more proximate to white), the higher the activity level of the synapse of the respective neuron, i.e., the more important the pixel. Therefore, the weight value in this embodiment which represents importance of the corresponding pixel is defined as $\beta^{(m-r)}$ that is positively correlated to the grayscale value of the corresponding pixel, in which m is an upper limit for the grayscale value of the corresponding pixel, r is the grayscale value of the corresponding pixel, and $\beta$ is greater than zero and smaller than one. In this embodiment, m is equal to 255. In this way, the greater the grayscale value of the pixel, the greater the weight value of the pixel. Further to the aforementioned example, the weight value corresponding to the pixel $Z_{ij}$ of the merged image $[Z_{ij}]_{3\times 3}$ for the specific instrument category is represented by a matrix of $$[W_{ij}]_{3\times 3} = \begin{bmatrix} \beta^{(255-75)} & \beta^{(255-135)} & \beta^{(255-10)} \\ \beta^{(255-30)} & \beta^{(255-0)} & \beta^{(255-30)} \\ \beta^{(255-0)} & \beta^{(255-2)} & \beta^{(255-30)} \end{bmatrix},$$

in which, $W_{ij}$ is the weight value for the pixel of the merged image for the specific instrument category at the pixel coordinates of (i,j). The weight values corresponding to the merged image for each of the instrument categories serve as a hidden layer of the spiking neural network model.

In step 26, the image processing unit 12 calculates a threshold value for each of the instrument categories according to the grayscale values and the weight values of the pixels of the merged image. The threshold value is a sum of products of the respective grayscale values and the respective weight values of the pixels of the merged image. Further to the aforementioned example, the threshold value is a sum of products of corresponding matrix elements of $[Z_{ij}]_{m\times n}$ and $[W_{ij}]_{m\times n}$, that is, $$\sum_{i=1}^{m}\sum_{j=1}^{n}(Z_{ij} \times W_{ij}).$$

In this way, during the detection process, the input image 14 undergoes image processing to result in a correspondence value which is to be compared with the threshold value, so as to determine whether the to-be-recognized instrument contained in the input image 14 belongs to one of the instrument categories corresponding to the threshold value.

Referring to FIG. 4, during the detection process, in step 30, the image capturing unit 11 captures the input image 14.

In step 31, the spiking neural network model is utilized to facilitate calculation. The image processing unit 12 enhances edge characteristics for the input image 14 by using the Laplacian of Gaussian filter. Since this step is similar to step 22 in the training process, detailed description associated with edge characteristic enhancement is omitted herein for the sake of brevity.

In step 32, the image processing unit 12 enhances texture characteristics for the input image 14 by using the Gabor filter. Since this step is similar to step 23 in the training process, detailed description associated with texture characteristic enhancement is omitted herein for the sake of brevity.

Figure 6:
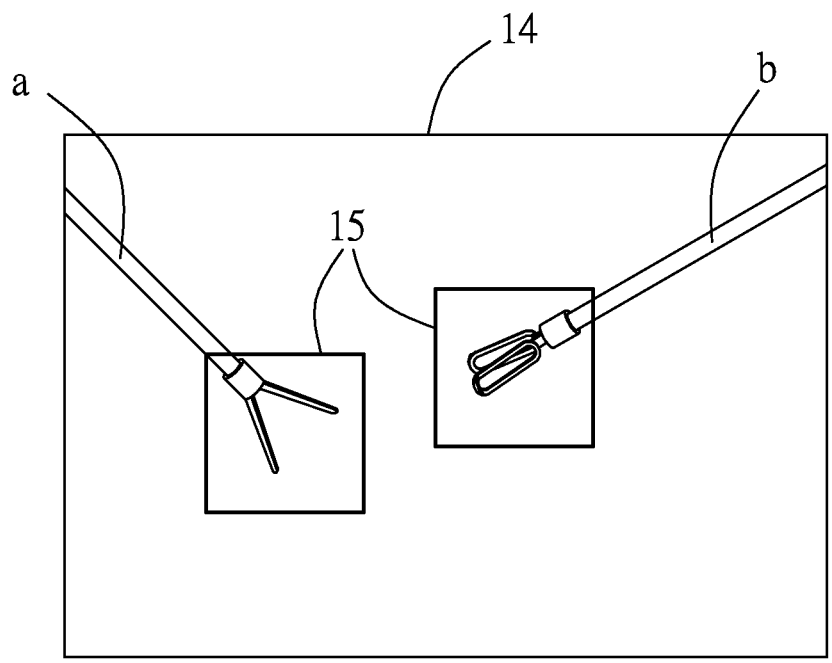
FIG. 6 is a schematic diagram illustrating image recognition of multiple instruments when the method for image recognition of an instrument is performed.
Figure 6:
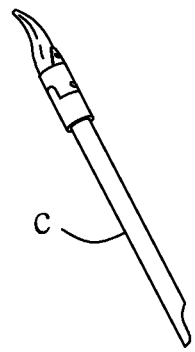
Figure 7:
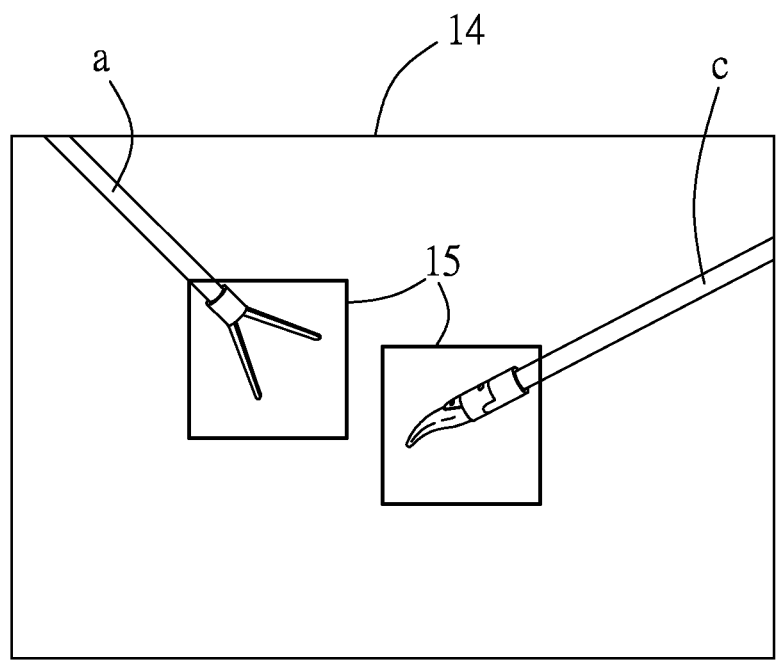
FIG. 7 is a schematic diagram illustrating image recognition of multiple instruments when the method for image recognition of an instrument is performed.

In step 33, the image processing unit 12 selects an image region from the input image 14, which has undergone the image processing in steps 31 and 32, to be a region-of-interest 15 (see FIGS. 6 and 7). Specifically, in this embodiment, a Kalman filter is used to select the region-of-interest 15 from a searching region. The searching region is by default the whole input image 14. The Kalman filter is used to determine the region-of-interest 15 from a current input image 14 according to whether or not any instrument is contained in a previous input image. When the previous input image does not contain any instrument, or when the previous input image is a first input image, the region-of-interest 15 is designated randomly by using the Kalman filter. On the other hand, when the previous input image contains at least one instrument, the Kalman filter is used to decide the region-of-interest 15 based on a position where the instrument is located in the previous input image. In this embodiment, the region-of-interest 15 is a matrix $[R_{ij}]_{m\times n}$ having m×n number of matrix elements, in which, $R_{ij}$ represents a grayscale value of a pixel located at pixel coordinates (i,j) of the region-of-interest 15.

In the subsequent steps, the image processing unit 12 determines, in a high-to-low order of the priority values of the instrument categories, whether a to-be-recognized instrument, if any, contained in the region-of-interest 15 belongs to one of the instrument categories according to the region-of-interest 15 and the respective one of the training results of the plural groups of sample images in the instrument library.

Specifically, in step 34, the image processing unit 12 selects, in a high-to-low order of the priority values of the instrument categories, one of the instrument categories which has not yet been compared, and calculates a correspondence value according to the respective grayscale values of the pixels of the region-of-interest 15 and the respective weight values of corresponding ones of the pixels of the merged image for said one of the instrument categories thus selected. The correspondence value is a sum of products of the grayscale values of the pixels of the region-of-interest 15 and the weight values of the corresponding pixels of the merged image. Further to the aforementioned example, the correspondence value is the sum of products of corresponding matrix elements of $[R_{ij}]_{m\times n}$ and $[W_{ij}]_{m\times n}$, that is, $$\sum_{i=1}^{m}\sum_{j=1}^{n}(R_{ij} \times W_{ij}).$$

In step 35, the image processing unit 12 determines whether the correspondence value calculated in step 34 is greater than a product of a first constant and the threshold value of said one of the instrument categories and is smaller than a product of a second constant and the threshold value. In this embodiment, the first constant is 0.8, and the second constant is 1.2. When a result of this determination made by the image processing unit 12 in step 35 is affirmative, the to-be-recognized instrument contained in the region-of-interest 15 is determined as belonging to said one of the instrument categories, and step 36 is then performed. Otherwise, the to-be-recognized instrument contained in the region-of-interest 15 is determined as not belonging to said one of the instrument categories, and the flow proceeds to step 37.

In step 36, the image processing unit 12 updates the priority value of said one of the instrument categories to which the to-be-recognized instrument belongs in the database 13 by increasing the priority value thereof. In addition, the image processing unit 12 stores a position of the region-of-interest 15 in the input image 14 in, for instance, the database 13 or a cache, so as to facilitate determination of the region-of-interest 15 in a subsequent input image according to the position thus stored using the Kalman filter in step 33 when a next input image is to be recognized. The flow then proceeds to step 38.

Particularly, since usage of the same instrument usually lasts for a certain period of time during the minimally invasive surgery, there is a high chance that an instrument recognized in the current input image 14 will appear in the next input image. Therefore, the high-to-low order of the priority values of the instrument categories is utilized for selection of the instrument category in step 34. Moreover, every time when the image processing unit 12 determines that the to-be-recognized instrument contained in the region-of-interest 15 belongs to a particular instrument category in step 35, the priority value of said particular instrument category is increased in step 36, so that the to-be-recognized instrument in the next input image 14 may be recognized more efficiently.

In step 37, the image processing unit 12 determines whether there is another one of the instrument categories which has not yet been selected for calculation of the correspondence value. When a result of this determination made by the image processing unit 12 in step 37 is affirmative, the flow goes back to step 34. Otherwise, step 38 is performed.

In step 38, the image processing unit 12 determines whether there is an unchecked region-of-interest using the Kalman filter. Specifically, the region-of-interest is determined using a sliding window with sequential increase in image coordinates such that two region-of-interests will overlap for at most 15 pixels in horizontal or vertical directions, and due to constant increase in image coordinates, the system will not visit the same region-of-interest more than once. When a result of this determination made by the image processing unit 12 in step 38 is affirmative, the process goes back to step 33 for selection of another region-of-interest 15. Otherwise, instrument recognition based on the input image 14 is ceased. In this way, an effect of image recognition of multiple instruments may be attained.

Figure 5:
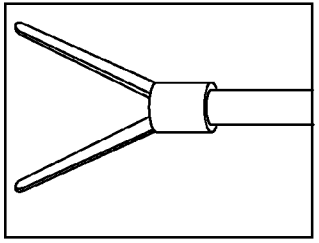
FIG. 5 is a schematic diagram illustrating an embodiment of instrument categories used in the method for image recognition of an instrument.
Figure 5:
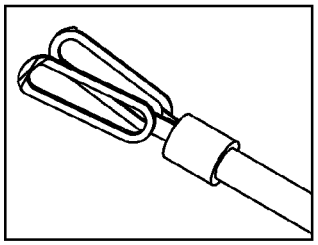
Figure 5:
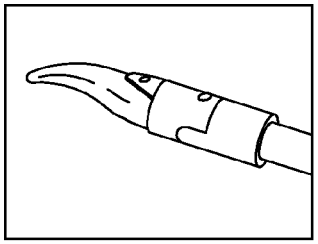

For instance, referring to FIG. 1 and FIG. 5, the database 13 stores plural groups of sample images, each of the groups belonging to a respective one of three instrument categories (A, B and C), and stores weight values for pixels of a merged image for each of the instrument categories (A, B and C) obtained based on the machine learning algorithm of the spiking neural network model during the training process (i.e., the training results obtained by steps 21 to 26).

Referring to FIG. 6, when the input image 14 contains two to-be-recognized instruments (a and b) which belong respectively to the instrument categories (A and B), the image processing unit 12, during the detection process, selects in sequence the region-of-interests 15, and determines that the two to-be-recognized instruments (a and b) belong respectively to the two instrument categories (A and B) according to the weight values. Subsequently, when the instrument (b) is substituted by another instrument (c) which belongs to the instrument category (C) during operation of the minimally invasive surgery, as illustrated in FIG. 7, the image processing unit 12 is also able to recognize the two instruments (a and c) appearing in the input image 14 to be belonging respectively to the instrument categories (A and C). Therefore, multiple instruments may be recognized in the input image 14. In this way, by virtue of the information stored in the database 13, multiple instruments may be recognized at the same time with the instruments being unaltered, i.e., without being provided with color rings, and instruments switched during surgery may be successfully recognized. Furthermore, when a new instrument (e.g., of a different model) is to be used during the surgery and may require recognition by the system, a sample image associated with the new instrument and belonging to a corresponding instrument category may be added to the database 13, and the image processing unit 12 executes the aforementioned machine learning algorithm in connection with the corresponding instrument category. Accordingly, instrument categories may be expanded with ease. Moreover, by virtue of the mechanism of the priority values, the order in which the image processing unit 12 determines in sequence whether the to-be-recognized instrument belongs to one of the instrument categories may be so arranged to reduce time required for image recognition.

Specifically, when determining that the to-be-recognized instrument contained in the region-of-interest 15 belongs to a known instrument category stored in the database 13, the image processing unit 12 may be programmed to generate and transmit a control signal, such that the robotic arm may be actuated to move the endoscope held thereby to a desired capturing position corresponding to the region-of-interest 15. For instance, the capturing position may be located at a middle of positions where the instrument (a) and the instrument (b) are located, so that an effect of image tracking of an instrument(s) being used may be achieved.

To sum up, the image processing unit 12, by virtue of the machine learning algorithm of the spiking neural network model, may achieve an effect of image recognition of an instrument in a precondition that the instrument is kept unaltered and without being provided with a color ring. Moreover, by virtue of the expandable database 13, a new instrument category may be incorporated therein. The mechanism of the priority value enables fast recognition of multiple instruments, and instruments switched during surgery may be successfully recognized. In addition, the image capturing unit 11 is held by the robotic arm, so as to maintain stability of the input images thus captured.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for image recognition of an instrument, the method to be implemented by a system including an image processing unit and a database, the database storing a plurality of groups of sample images, each of the groups belonging to a respective one of a variety of instrument categories, each of the instrument categories corresponding to a respective priority value, the method comprising the steps of:

obtaining, by the image processing unit, an input image containing a to-be-recognized instrument;

selecting from the input image, by the image processing unit, a region-of-interest containing the to-be-recognized instrument;

determining in a high-to-low order of the priority values of the instrument categories, by the image processing unit, whether the to-be-recognized instrument contained in the region-of-interest belongs to one of the instrument categories according to the region-of-interest and the respective one of the groups; and increasing, by the image processing unit, the priority value corresponding to said one of the instrument categories when it is determined that the to-be-recognized instrument contained in the region-of-interest belongs to said one of the instrument categories.

2. The method as claimed in claim 1, the system further including an image capturing unit which is held by a robotic arm, wherein, the step of obtaining an input image includes capturing, by the image capturing unit, the input image and outputting the input image thus captured to the image processing unit.

3. The method as claimed in claim 1, wherein, in the step of selecting from the input image a region-of-interest, each of the region-of-interest and the sample images in the groups has pixels, each being located at different pixel coordinates and having a grayscale value, the method, prior to the step of obtaining an input image, further comprising the steps of:

for each of the instrument categories, generating, by the image processing unit, a merged image, each of pixels of the merged image having a grayscale value equal to an average of the grayscale values of those of the pixels of all the sample images in the respective one of the groups located at the same pixel coordinates as the pixel coordinates of the pixel of the merged image;

for each of the instrument categories, calculating, by the image processing unit, a weight value for each of the pixels of the merged image according to the grayscale value of the pixel of the merged image, the weight value being positively correlated to the grayscale value; and for each of the instrument categories, calculating, by the image processing unit, a threshold value according to the grayscale values of the pixels of the merged image and the weight values of the pixels of the merged image.

4. The method as claimed in claim 3, wherein, in the step of calculating the weight value for each of the pixels, the weight value is expressed as $\beta(m-r)$, in which m is an upper limit for the grayscale values of the pixels, r is the grayscale value of the pixel, and $\beta$ is greater than zero and smaller than one.

5. The method as claimed in claim 3, wherein, in the step of calculating a threshold value, the threshold value is a sum of each product of the grayscale value and the weight value of a respective one of the pixels of the merged image.

6. The method as claimed in claim 3, wherein, the step of determining whether the to-be-recognized instrument contained in the region-of-interest belongs to one of the instrument categories includes:

calculating in the high-to-low order of the respective priority values of the instrument categories, by the image processing unit, a correspondence value according to the grayscale values of the pixels of the region-of-interest and the weight values of corresponding ones of the pixels of the merged image; and determining, by the image processing unit, that the to-be-recognized instrument of the region-of-interest belongs to said one of the instrument categories when the correspondence value thus calculated is greater than a product of a first constant and the threshold value of said one of the instrument categories and is smaller than a product of a second constant and the threshold value of said one of the instrument categories.

7. The method as claimed in claim 6, wherein, in the step of calculating a correspondence value, the correspondence value is a sum of each product of the grayscale value of a respective one of the pixels of the region-of-interest and the weight value of the respective one of the pixels of the merged image.

8. The method as claimed in claim 6, wherein, in the step of determining that the to-be-recognized instrument contained in the region-of-interest belongs to said one of the instrument categories, the first constant is 0.8, and the second constant is 1.2.

9. The method as claimed in claim 3, prior to the step of generating a merged image, further comprising the step of:

using, by the image processing unit, a filter configured for edge enhancement and a filter configured for texture enhancement to process each of the sample images in the groups.

10. The method as claimed in claim 9, prior to the step of selecting from the input image a region-of-interest, further comprising the step of:

using, by the image processing unit, the filter configured for edge enhancement and the filter configured for texture enhancement to process the input image.

11. A system for image recognition of an instrument, said system comprising:

a database storing a plurality of groups of sample images, each of the groups belonging to a respective one of a variety of instrument categories, each of the instrument categories corresponding to a respective priority value; and an image processing unit coupled electrically to said database, and programmed to obtain an input image containing a to-be-recognized instrument, select from the input image a region-of-interest containing the to-be-recognized instrument, determine, in a high-to-low order of the priority values of the instrument categories, whether the to-be-recognized instrument contained in the region-of-interest belongs to one of the instrument categories according to the region-of-interest and the respective one of the groups of sample images, and increase the priority value of said one of the instrument categories when it is determined that the to-be-recognized instrument contained in the region-of-interest belongs to said one of the instrument categories.

12. The system as claimed in claim 11, further comprising an image capturing unit which is held by a robotic arm, the input image being captured by said image capturing unit and being provided to said image processing unit.

13. The system as claimed in claim 11, wherein, each of the region-of-interest and the sample images in the groups has pixels, each being located at different pixel coordinates and having a grayscale value, said image processing unit being further programmed to:

for each of the instrument categories, generate a merged image, each of pixels of the merged image having a grayscale value equal to an average of the grayscale values of those of the pixels of all the sample images in the respective one of the groups located at the same pixel coordinates as the pixel coordinates of the pixel of the merged image;

for each of the instrument categories, calculate a weight value for each of the pixels of the merged image according to the grayscale value of the pixel of the merged image, the weight value being positively correlated to the grayscale value; and for each of the instrument categories, calculate a threshold value according to the grayscale values and the weight values of the pixels of the merged image.

14. The system as claimed in claim 13, wherein, the weight value is expressed as $\beta^{(m-r)}$, in which m is an upper limit for the grayscale values of the pixels, r is the grayscale value of the pixel, and $\beta$ is greater than zero and smaller than one.

15. The system as claimed in claim 13, wherein the threshold value is a sum of each product of the grayscale value and the weight value of a respective one of the pixels of the merged image.

16. The system as claimed in claim 13, wherein said image processing unit is further programmed to:

calculate, in a high-to-low order of the priority values of the instrument categories, a correspondence value according to the grayscale values of the pixels of the region-of-interest and the weight values of corresponding ones of the pixels of the merged image; and determine that the to-be-recognized instrument of the region-of-interest belongs to said one of the instrument categories when the correspondence value thus calculated is greater than a product of a first constant and the threshold value of said one of the instrument categories and is smaller than a product of a second constant and the threshold value of said one of the instrument categories.

17. The system as claimed in claim 16, wherein the correspondence value is a sum of each product of the grayscale value of a respective one of the pixels of the region-of-interest and the weight value of the respective one of the pixels of the merged image.

18. The system as claimed in claim 16, wherein, the first constant is 0.8, and the second constant is 1.2.

19. The system as claimed in claim 13, wherein said image processing unit is further programmed to:
   use a filter configured for edge enhancement and a filter configured for texture enhancement to process each of the sample images in the groups.

20. The system as claimed in claim 19, wherein said image processing unit is further configured to:
   use the filter configured for edge enhancement and the filter configured for texture enhancement to process the input image.

* * * * *